Aug. 22, 1967     J. L. MEHARRY     3,337,068
GRAVITY BED AUGER ARRANGEMENT
Filed Jan. 11, 1967     3 Sheets-Sheet 1
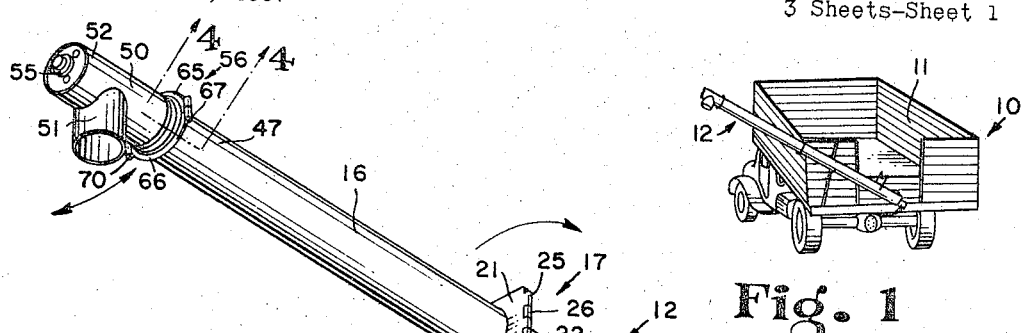
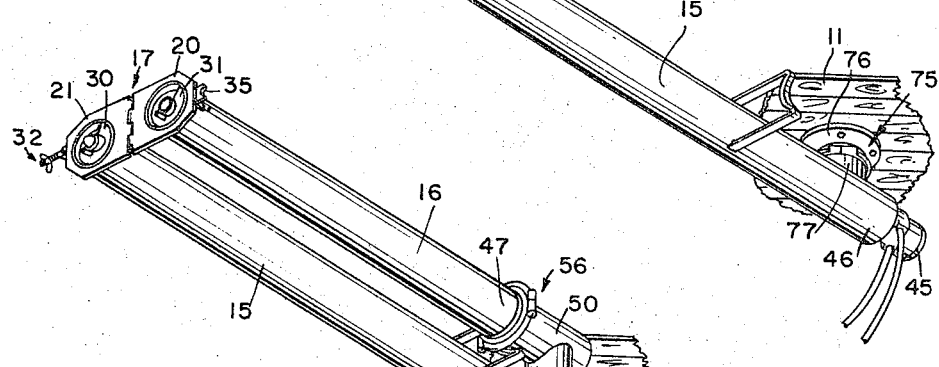
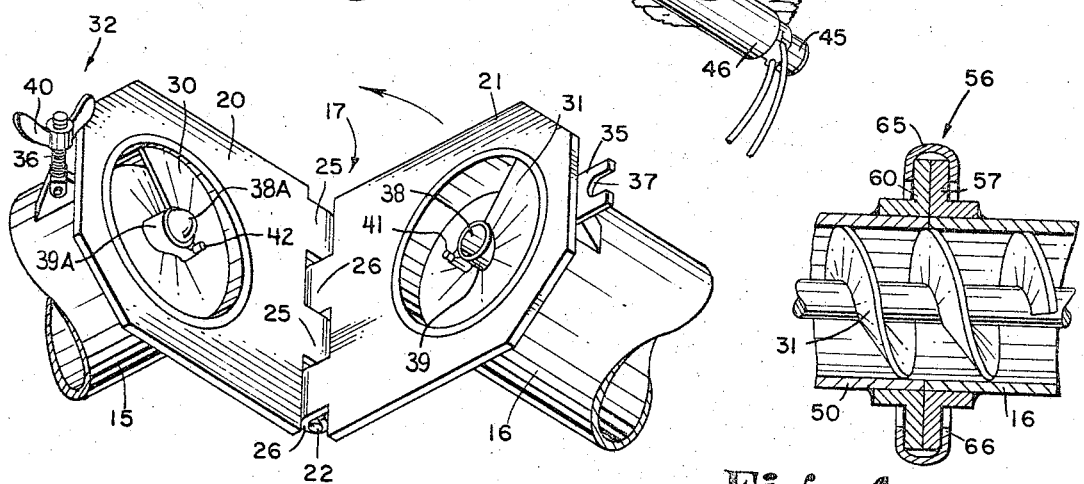
INVENTOR.
JAMES L. MEHARRY,
BY
Lockwood, Woodard, Smith & Weikart.
ATTORNEYS

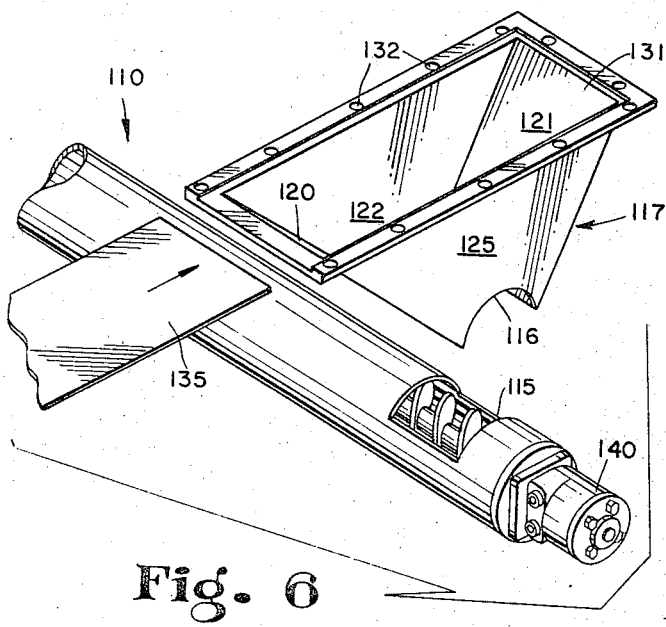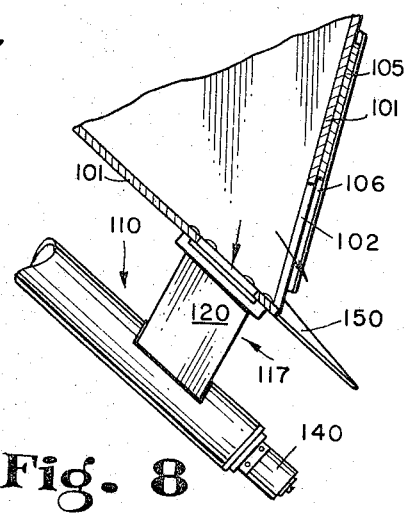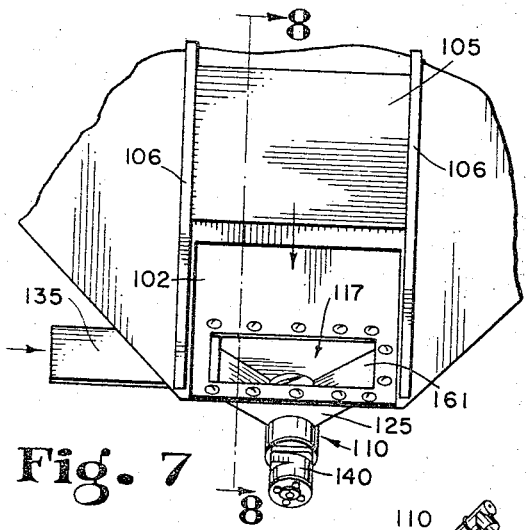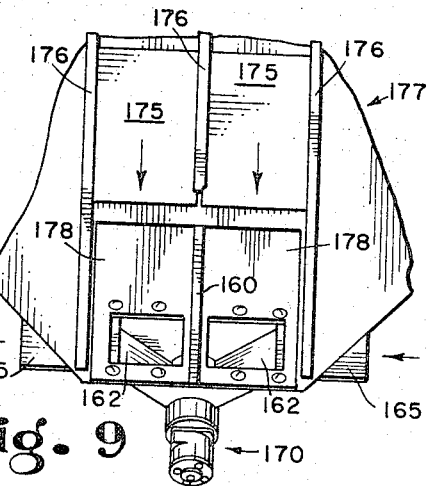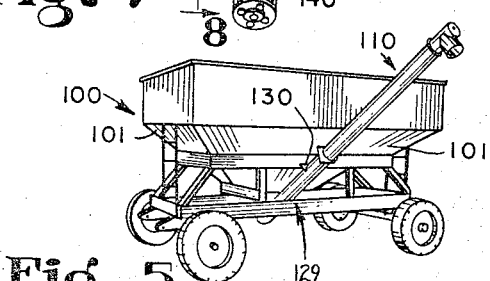

Aug. 22, 1967    J. L. MEHARRY    3,337,068
GRAVITY BED AUGER ARRANGEMENT
Filed Jan. 11, 1967    3 Sheets-Sheet 3

INVENTOR.
JAMES L. MEHARRY
BY
Woodard, Weikart, Emhardt & Naughton
Attorneys.

United States Patent Office 3,337,068
Patented Aug. 22, 1967

3,337,068
GRAVITY BED AUGER ARRANGEMENT
James L. Meharry, R.R. 1, Wingate, Ind. 47994
Filed Jan. 11, 1967, Ser. No. 613,986
8 Claims. (Cl. 214—83.26)

ABSTRACT OF THE DISCLOSURE

An auger arrangement including an auger which can be broken intermediate of its length for storage and movement. The auger is either mounted on the back of a truck or underneath a gravity bed vehicle. When mounted on the gravity bed vehicle the gravity bed can be discharged in its usual fashion from the vertical side of the vehicle or the auger can be used to discharge the gravity bed without extensive modifications of the structure.

Cross references to related applications

This application is a continuation-in-part of my application Ser. No. 499,984, filed Oct. 21, 1965.

Background of the invention

*Field of the invention.*—This invention relates to a gravity bed vehicle incorporating an auger.

*Description of the prior art.*—It is desirable that gravity bed vehicles such as those used in moving granular fertilizer, grain and the like from place to place be provided with a relatively long auger arrangement for transporting the grain from the bed of the vehicle to the desired location. It is difficult, however, to mount such a long auger on a gravity bed vehicle in such a way that it can be safely moved from place to place. Also, in the past the augers which have been mounted on the gravity bed vehicle have interferde with conventional discharge of the gravity bed. Thus, it was necessary to perform extensive modification to convert to auger operation from conventional operation or to conventional operation from auger operation.

Summary of the invention

One embodiment of the present invention might include in combination with a gravity bed vehicle having four side walls and a pair of transverse sides, three of said four side walls each having a downward slope whereby grain and the like can move across said three side walls by gravity, the fourth of said side walls being vertical and located at one transverse side of the vehicle, one of said three side walls extending across the vehicle to said one transverse side from the opposite transverse side thereof, said fourth side wall having an outlet opening at the lower portion thereof, and means for selectively opening and closing said outlet opening, the improvement which comprises: a first tubular housing; a first auger in said tubular housing; means for rotating said first auger in said housing; said housing having an inlet opening in the side walls thereof; conduit means mounting said auger housing on said one side wall so as to extend beneath said one side wall upwardly from said inlet opening; said last mentioned means also providing a passage to said inlet opening from the lower portion of said gravity bed which passage is separate from said side wall opening; and means for selectively closing off said passage.

One object of this invention is to provide an improved gravity bed auger arrangement.

Another object of this invention is to provide a gravity bed auger arrangement which can be unloaded in conventional fashion and which can be auger unloaded.

A further object of this invention is to provide a gravity bed auger arrangement which can be easily and safely moved from place to place.

Brief description of the drawing

FIG. 1 is a perspective view of a truck having the auger arrangement of the present invention mounted on the rear thereof.

FIG. 2 is an enlarged view of the auger arrangement of FIG. 1.

FIG. 2A is a view similar to FIG. 2 but showing the auger arrangement in a folded-up position.

FIG. 3 is an enlarged perspective view of a portion of the structure illustrated in FIGS. 2 and 2A.

FIG. 4 is an enlarged section taken along the line 4—4 of FIG. 2 in the direction of the arrows.

FIG. 5 is a perspective view of a gravity bed vehicle incorporating the improved auger arrangement of the present invention.

FIG. 6 is an exploded perspective view of the auger arrangement of FIG. 5.

FIG. 7 is a fragmentary enlarged side elevation of a portion of the structure illustrated in FIG. 5.

FIG. 8 is a vertical section taken along the line 8—8 of FIG. 7 in the direction of the arrows.

FIG. 9 is a view similar to FIG. 7 of an alternative embodiment of the present invention.

Description of the preferred embodiments

Figure 10:
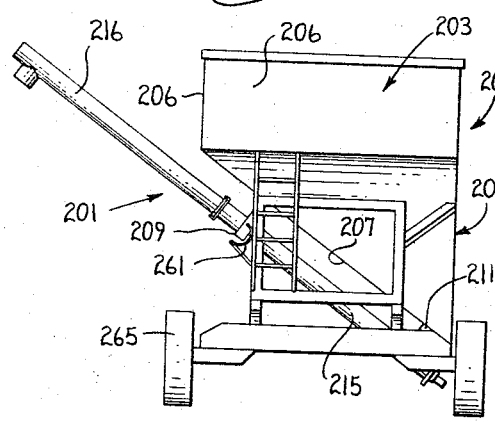
FIG. 10 is a front elevation of a gravity bed vehicle embodying the present invention.

Referring more particularly to the drawings, there is illustrated a truck 10 having a bed 11 designed to receive and carry granular-type materials such as grain or fertilizer. The truck 10 is a dump truck whereby the bed 11 can be tilted as shown in FIG. 1 to cause the material within the truck to flow to the rear of the truck. Mounted upon the rear of the truck is an auger arrangement 12 which is shown in more detail in FIG. 2.

The auger arrangement 12 includes a pair of tubular cylindrical housings 15 and 16 which are connected together by a hinge arrangement 17. The hinge arrangement includes a pair of flanges 20 and 21 which are fixed to the respective housings 15 and 16 and a pin 22 which extends through interlocking portions 25 and 26 having a bore therethrough for reception of the pin. It can be seen that the housings 15 and 16 are pivotal into a position as shown in FIG. 1 wherein the housings are coextensive and coaxial so that material being moved by the augers 30 and 31 within the housings can move from one housing to the other without dropping out between the housings. The two housings are locked in the position of FIG. 1 by means of the thumb nut arrangement 32 best shown in FIG. 3. This arrangement includes a bracket 35 fixed to the housing of flange 21 and a threaded member 36 pivotally mounted on the housing 15. When the two flanges 20 and 21 have been brought together as shown in FIG. 2, the threaded member 36 is pivoted down into the slot 37 in the bracket 35 and the wing nut 40 is tightened locking the two housings together.

The two augers 30 and 31 are coupled together for the driving of the auger 31 by the auger 30 when the two housings 15 and 16 are coupled together. The auger 31 is provided with a recess 38 in its stem 39 while the auger 30 is provided with a projection 38A on its stem 39A. When the augers are in the position of FIG. 2, the projection 38A mates with the recess 38 to maintain the stems in alignment and to maintain pin 41 in engagement with pin 42. The pins 41 and 42 are integral with their respective stems and engage one another to drive the auger 31 from the auger 30.

The hydraulic motor 45 is mounted on the end 46 of the housing 15 and is arranged to drive the screw augers 30 and 31 in such a direction that the material moves from right to left as viewed in FIG. 2. The housing 15 and the motor 45 provide at the end 46 of the housing suitable means for mounting the auger 30 with the auger secured to the motor. Connected to the housing 16 at its outlet end 47 is an outlet conduit 50 which has an outlet opening in its side wall leading to the perpendicularly extending conduit 51. At the end 52 of the conduit 50, the auger 31 is rotatably mounted in bearing means 55.

The outlet conduit 50 is coupled to the housing 16 by a coupling arrangement 56 which is shown in detail in FIG. 4. The coupling arrangement 56 includes a pair of flanges 57 and 60 which are fixed to the respective housing and conduit and which extend radially outwardly around the complete periphery of the respective housing and conduit. The conduit 50 is coupled to the housing 16 so that the conduit is rotatable about its axis relative to the housing 16. This coupling is accomplished by means of two half moon shaped members 65 and 66 which have a U-shaped cross section as shown in FIG. 4 so that the members straddle the flanges. The half moon shaped members 65 and 66 are secured together by bolts 67 and 70.

An identical coupling to the coupling 56 is provided at 75 to couple the truck bed 11 to the housing 15. The truck bed 11 has an opening about which is secured a conduit 76. The conduit 76 is provided with a flange similar to the flange 57 on the housing 16. An inlet conduit 77 is secured to the housing 15 and leads to an inlet opening in the wall of the housing 15. The inlet conduit 77 has a flange similar to the flange 60; thus, the coupling 75 of the conduit 76 and the conduit 77 is identical to the coupling of the housing 16 and the conduit 50 and permits housing 15 to swing through a circular path about the axis of the conduits 76 and 77. In this manner, the auger arrangement of FIG. 2 can be set at any desired angle to discharge the contents of the truck bed.

In like manner the user of the present apparatus can grasp the conduit 51 and rotate it around the axis of the conduit 50 and the housing 16 so that the conduit 51 can discharge material at any of a large plurality of angles.

Referring now to FIG. 5, there is illustrated a gravity bed vehicle 100 which has side walls 101 which slope downwardly and inwardly. In conventional fashion, the side walls 101 have an opening 102 which can be opened to discharge the contents below the vehicle. This opening is controlled by a door 105 slidable in tracks 106 fixed to the respective side wall 101. Mounted upon a second of the side walls 101 adjacent the lower end thereof is the auger arrangement 110. The auger arrangement 110 is identical to the auger arrangement 12 except for the manner in which the auger arrangement 110 is mounted on the gravity bed vehicle. Referring to FIGS. 6 and 7, the auger arrangement 110 has an inlet opening 115 which is formed to fit the outlet opening 116 of the tapering conduit 117. The tapering conduit 117 includes a pair of generally parallelogram shaped side walls 120 and 121 which taper toward one another and toward the auger arrangement 110. The side walls 120 and 121 are connected by generally triangular shaped side walls 122 and 125. An additional bracket 130 along with the conduit 117 fixedly mounts the lower housing 129 of the auger arrangement 110 on the gravity bed vehicle 100. The conduit 117 is fixed at its larger end 131 to the vehicle 100 by means of suitable bolts extending through the bores 132. Flow into the conduit 117 can be controlled by a slide plate 135 which is accessible on the outside of the gravity bed vehicle.

The auger arrangement 110 incorporates a hydraulic motors 140 in similar fashion to the auger arrangement 12 and in other respects is identical to the auger arrangement 12. It will be noted that the auger arrangement 110 can be folded along side of the gravity bed vehicle 100 to reduce the sideward dimension of the vehicle to assist in road movement thereof. One important advantage of the arrangement of FIGS. 5, 6, 7 and 8 is the fact that the auger arrangement 110 need not be removed from the vehicle in order to discharge material in normal fashion through the opening 102. When material is so discharged through the opening 102, a chute 150 fixed to the vehicle guides the material to its intended destination.

An alternative embodiment of the invention illustrated in FIGS. 5 through 8 is shown in FIG. 9 and is generally identical to the embodiment of FIGS. 5 through 8 except the gravity bed vehicle is provided with a partition 160 fixed to the inside of the side walls of the vehicle, said partition dividing the vehicle so that two different types of material can be simultaneously carried therein. Instead of the single discharge opening 161 (FIG. 7) afforded by the conduit 117, a pair of discharge openings 162 are provided, each of said discharge openings being controllable by a slide plate 165 with the two slide plates being slidable toward one another to close the openings or apart from one another to open the openings. The auger 170 of FIG. 9, which is identical to the auger arrangement 110, can be used to mix the materials to a proportion depending on the setting of the slide plates 165. The gravity bed vehicle of FIG. 9 is also provided with a pair of doors 175 which control openings 178 corresponding to the single opening 102 of FIGS. 6, 7 and 8. Three track members 176 are secured to the vehicle 177 of FIG. 8 in order to provide tracks for the doors 175. In all other respects the embodiment of FIG. 9 is identical to the embodiment above described of FIGS. 5, 6, 7 and 8.

Referring now more particularly to FIGS. 10 through 14, there is illustrated a gravity bed vehicle 200 which has a foldable auger 201 mounted thereon in the same fashion as the mounting of the foldable auger 110 on the gravity bed vehicle 100. The gravity bed vehicle 200 has four side walls 202, 203, 204 and 205. Each of the side walls 203, 204 and 205 has an upper vertical portion 206 and a lower sloping portion 207. The sloping portions of the side walls slope sufficiently to cause grain and the like to move across the sloping portions of the side walls to the lowermost portion of the gravity bed. The side wall 202 is vertical and has an opening therein identical to the opening 102 in the gravity bed vehicle 100. The opening in the side wall 202 is controlled by a door 210 which is identical to the door 105 in the gravity bed vehicle 100. It can be appreciated that the door 210 can be used to permit grain to flow to the side of the vehicle 200 for discharging the grain alongside of the vehicle. Frequently, such discharge of grain is desired in operations on the farm, for example, into a ground elevator or dumping pit. In other words, it is not desired that the grain be discharged below the vehicle but instead be discharged alongside the vehicle, and the gravity bed vehicle of FIGS. 10 through 14 permits such discharge as well as permitting complete discharge of the vehicle.

As mentioned, the foldable auger 201 is mounted on the gravity bed vehicle 200 in the same fashion as is illustrated in FIGS. 5–9. Thus, there is provided a bracket 209 similar to bracket 130 and a tapering conduit 211 which is identical to the tapering conduit 117 and which conducts the grain from the lowermost portion of the gravity bed into the auger 201. The gravity bed vehicle 200 is also provided with a sliding door similar to the door 105 for selectively opening and closing the conduit 211 to permit grain to flow into the auger 201. It can be appreciated, therefore, that either the door 210 can be used to discharge grain or the auger 201 can be used to discharge grain from the gravity bed vehicle.

Figure 13:
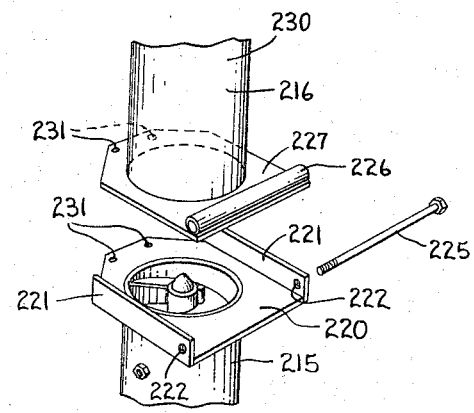
FIG. 13 is an exploded perspective view of a portion of the structure of FIGS. 10–12.

The auger 201 is foldable in exactly the same manner as described above in connection with the gravity bed vehicle 100. The details of connection of the first portion 215 and the second portion 216 of the auger 201 are somewhat different than the connection illustrated in FIG. 3. The driving connection between the two augers within the portions 215 and 216 is identical to the driving connection between the augers 30 and 31 in that structure identical to the above described structure 38, 38A, 39, 39A, 42 and 41 is used. The flanges 20 and 21 of FIG. 3 are modified, however, in the construction of FIGS. 10–14. Referring to FIG. 13, the portion 215 of the auger is provided with a flange 220 which has mounted thereon at the edges thereof a pair of additional parallel flanges 221. The flanges 221 serve as a mounting point for the portion 216 of the auger. The flanges 221 are provided with bores 222 which receive a bolt 225 which extends through a tube 226. The tube 226 is welded to a flange 227 fixed to the housing 230 of the portion 216 of the auger.

It has been found that the flanges 221 serve to prevent spillage from between the flanges 220 and 227. Also, the flanges 221 reinforce the hinge and prevent twisting of the portion 215 of the auger relative to the portion 216 thereof. Finally, the flanges 221 serve to line up the two halves 215 and 216 of the auger. In order to secure the two portions 215 and 216 together in coaxial relationship as illustrated in FIG. 10, bolts are placed through bores 231 in the flanges 220 and 227.

Figure 14:
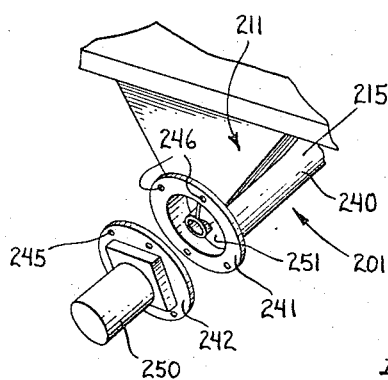
FIG. 14 is an exploded perspective view of a further portion of the structure of FIGS. 10–12.

Referring now to FIG. 14, the embodiment of FIGS. 10 through 14 differs from the above described embodiment in that the housing 240 of the portion 215 of the auger has on its lower end a radially outwardly extending flange 241. This flange 241 mates with a cover 242 having bores 245 therearound. The bores 245 and bores 246 in the flange 241 receive bolts for securing the cover 242 to the flange 241. Mounted upon the cover 242 is a hydraulic motor 250 which operates to drive the auger 201 in the same fashion as the motor 140 drives the auger 110. The coupling connection between the motor 250 and the auger 251 inside of the housing 240 is similar to the coupling between the two portions of the auger as illustrated in FIG. 3. In other words, the auger portion 30 and the auger portion 31 are coupled by the male member 38A and the female member 38 as well as the pins 41 and 42. An identical coupling is made between the motor 250 and the auger portion 251 of FIG. 14. The advantage of the structure illustrated in FIG. 14 is that the auger portion 251 can be withdrawn from the housing 240 by sliding it downwardly out of the housing and there is no interference with the auger portion 251 once the cover 242 has been removed from the flange 241.

Figure 11:
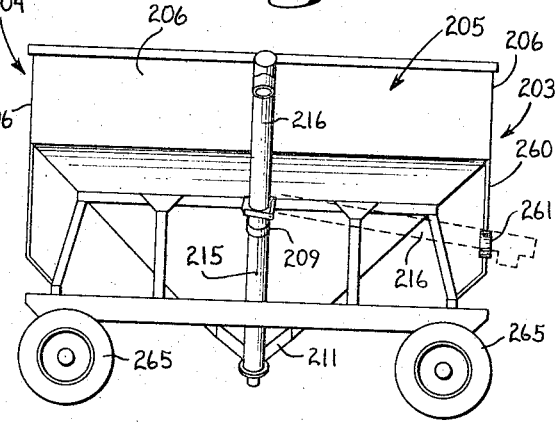
FIG. 11 is a side elevation of the gravity bed vehicle of FIG. 10.
Figure 12:
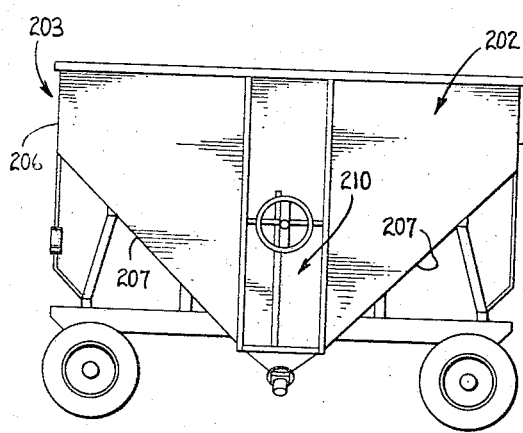
FIG. 12 is a side elevation taken from the opposite side from FIG. 11 of the gravity bed vehicle of FIG. 10.

Referring to FIG. 11, it will be noted that the gravity bed vehicle is provided with a ladder 260. Mounted upon the ladder 260 is a receptacle 261 to which may be strapped the auger portion 216. The receptacle 261 has a part cylindrical shape within which the auger portion 216 can be nested. When the auger portion 216 is so nested, it can be strapped to the receptacle by suitable straps or by a rope or the like. It will be noted that, when the auger is folded and in the dotted line position of FIG. 11, the entire auger is inboard of the wheels 265. When the auger is so folded and attached to the receptacle 261, the gravity bed vehicle can be easily moved on the highway and otherwise from place to place without danger of the auger striking objects, thus preventing damage to other objects and other vehicles as well as preventing damage to the gravity bed auger arrangement. It will also be noted that the portion 215 of the auger 201 is always located beneath the main body of the gravity bed and inboard of the wheels 265 and furthermore is located with its center of gravity generally at the center of gravity of the gravity bed vehicle.

From the above description, it will be evident that the present invention provides an improved auger arrangement which can be folded to reduce its length, thus adapting it for use in connection with the bed of a truck. It will also be evident that the present invention provides a gravity bed vehicle arrangement which can be unloaded in conventional fashion and which can also be unloaded by means of an auger arrangement. It will also be noted that the gravity bed vehicle of the present invention need not have its auger arrangement disconnected therefrom in order to conventionally unload the gravity bed vehicle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In combination with a gravity bed vehicle having four side walls and a pair of transverse sides, three of said four side walls each having a downward slope whereby grain and the like can move across said three side walls by gravity, the fourth of said side walls being vertical and located at one transverse side of the vehicle, one of said three side walls extending across the vehicle to said one transverse side from the opposite transverse side thereof, said fourth side wall having an outlet opening at the lower portion thereof, and means for selectively opening and closing said outlet opening, the improvement which comprises: a first tubular housing; a first auger in said tubular housing; means for rotating said first auger in said housing; said housing having an inlet opening in the side wall thereof; conduit means mounting said auger housing on said one side wall so as to extend beneath said one side wall upwardly from said inlet opening; said last mentioned means also providing a passage to said inlet opening from the lower portion of said gravity bed which passage is separate from said side wall opening; and means for selectively closing off said passage.

2. The arrangement of claim 1 additionally comprising a second tubular housing; a second auger in said second tubular housing; said housing each having a first end and a second end; hinge means connecting said housings at said second ends; said housings being pivotal relative to one another through the swinging of said hinge means between a first position in which said housings are coaxial and coextensive and a second position in which said housings are broken relative to one another; means for connecting said augers to one another when said augers are in said first position whereby one auger can drive the other auger; a receptacle for said other tubular housing mounted on said gravity bed inboard of said transverse sides; said second tubular housing having its distal portion received in said receptacle when said second tubular housing is in said second position.

3. The arrangement of claim 1 wherein said housing has a lower first end and an upper second end; a cover for said housing lower first end; said means for rotating said auger being mounted on the outside of said cover and incorporating means extending through said cover and engaging said auger; said housing having an outwardly extending peripheral flange at the lower first end of said housing; and bolts coupling said cover to said flange; said bolts being removable for removing said cover and auger from said housing.

4. The arrangement of claim 2 additionally comprising a peripheral radially extending first flange at the second end of said first housing; a pair of additional parallel flanges on said first flange and extending perpendicularly thereof; a peripheral radially extending second flange at the second end of said second housing; a tube fixed to said second flange; said hinge means comprising a bolt extending through said parallel flanges and through said tube with said tube being received between said parallel flanges; said parallel flanges acting to prevent spillage, reinforce the hinge and to line up the two housings.

5. The arrangement of claim 4 additionally comprising a cover for said first end of said first housing; said means for rotating said first auger being mounted on the outside of said cover and incorporating means extending through said cover and engaging said first auger; said first housing having an outwardly extending peripheral flange at the first end of said first housing; and bolts coupling said cover to said flange; said bolts being removable for removing said cover and auger from said housing.

6. In combination with a gravity bed vehicle having a pair of side walls which face generally toward one another, one of said side walls having a downward slope whereby grain and the like can move across said one side wall by gravity, the other of said side walls being generally vertical and having an outlet opening at the lower portion thereof, said other side wall being located at one side of the vehicle and said one side wall extending across said vehicle from said one side to the opposite side thereof, and means for selectively opening and closing said outlet opening, the improvement which comprises a tubular housing, an auger in said tubular housing, means for rotating said auger in said housing, said housing having an inlet opening in the side wall thereof, and conduit means mounting said auger housing on said one side wall so as to extend beneath said one side wall upwardly from said inlet opening, said last mentioned means also providing a passage to said inlet opening from the lower portion of said gravity bed which passage is separate from said side wall opening; and means for selectively closing off said passage.

7. The arrangement of claim 6 additionally comprising another tubular housing, a second auger in said other tubular housing, said housings each having a first end and a second end, hinge means connecting said housings at said second ends, said housings being pivotal relative to one another through the swinging of said hinge means between a first position in which said housings are coaxial and coextensive and a second position in which said housings are broken relative to one another, and means for connecting said augers to one another when said augers are in said first position whereby one auger can drive the other auger.

8. The arrangement of claim 6 additionally comprising a partition dividing said gravity bed vehicle into two containers, said passage leading from both sides of said partition to said auger housing, said means for selectively closing off said passage comprising two doors one for closing off the passage on each side of said partition.

References Cited

UNITED STATES PATENTS 1,398,649  11/1921  Richards ---------- 214—83.26
2,499,925  3/1950  Lockenuitz ---------- 298—27

EVON C. BLUNK, *Primary Examiner.*

RICHARD E. AEGERTER, *Examiner.*